US 8,342,282 B2

(12) United States Patent  (10) Patent No.: US 8,342,282 B2
Kuramochi et al.  (45) Date of Patent: Jan. 1, 2013

(54) MOTORCYCLE

(75) Inventors: Daisuke Kuramochi, Wako (JP); Hikaru Yokomura, Wako (JP); Yuji Tsujimoto, Wako (JP); Koichi Nakayama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 50 days.

(21) Appl. No.: 12/999,877

(22) PCT Filed: Jun. 10, 2009

(86) PCT No.: PCT/JP2009/060623
§ 371 (c)(1),
(2), (4) Date: Dec. 17, 2010

(87) PCT Pub. No.: WO2009/154120
PCT Pub. Date: Dec. 23, 2009

(65) Prior Publication Data
US 2011/0120796 A1 May 26, 2011

(30) Foreign Application Priority Data
Jun. 20, 2008 (JP) ................. P2008-161899

(51) Int. Cl.
*B62K 11/02* (2006.01)
(52) U.S. Cl. ..................... 180/219; 180/311
(58) Field of Classification Search .............. 180/219, 180/311, 68.4
See application file for complete search history.

(56) References Cited

U.S. PATENT DOCUMENTS

| 4,715,509 | A  | * | 12/1987 | Ito et al. ................ 220/86.2 |
| 5,915,344 | A  | * | 6/1999  | Suzuki et al. ............ 123/41.11 |
| 6,167,849 | B1 | * | 1/2001  | Wilson .................. 123/41.86 |
| 7,270,213 | B2 | * | 9/2007  | Suzuki et al. ................. 180/219 |
| 2002/0189877 | A1 | * | 12/2002 | Yagisawa et al. ........... 180/219 |
| 2004/0094674 | A1 | * | 5/2004  | Bozmoski et al. ........... 248/58 |
| 2005/0139433 | A1 | * | 6/2005  | Kojika .................... 188/31 |
| 2006/0220407 | A1 |   | 10/2006 | Misaki et al. |
| 2007/0277517 | A1 | * | 12/2007 | Yamakura et al. ............ 60/323 |
| 2008/0223642 | A1 | * | 9/2008  | Shiraishi ................. 180/219 |
| 2009/0242304 | A1 | * | 10/2009 | Tahara et al. .............. 180/219 |
| 2010/0307852 | A1 | * | 12/2010 | Aramayo et al. ............ 180/219 |

FOREIGN PATENT DOCUMENTS

| JP | 63-93687   | A | 4/1988 |
| JP | 2-128973   | A | 5/1990 |
| JP | 3-25851    | U | 3/1991 |
| JP | 6-305469   | A | 11/1994 |
| JP | 2006-281948 | A | 10/2006 |

* cited by examiner

Primary Examiner — Anne Marie Boehler
Assistant Examiner — Maurice Williams
(74) Attorney, Agent, or Firm — Birch, Stewart, Kolasch & Birch, LLP

(57) ABSTRACT

Disclosed is a motorcycle fitted with a canister. A canister (55) is disposed along the body frame (20) at a position outside the body frame and closer to the body frame than the tip end of a tandem step (54R).

14 Claims, 10 Drawing Sheets

MOTORCYCLE

TECHNICAL FIELD

The present invention relates to an improvement in motorcycles, and more particularly to a motorcycle provide with a canister.

BACKGROUND ART

In order to prevent escape of fuel vapors from a fuel tank to the atmosphere during stopping or parking of a vehicle, a fuel vapor adsorption device, which is so-called "canister", is provided on the vehicle.

Conventionally, a motorcycle provided with a fuel vapor adsorption device is known as disclosed in Patent Document 1.

As disclosed in Patent Document 1, the conventional canister is accommodated in a body frame portion formed by a seat rail extending rearwards of the vehicle body and a diagonally extending sub-frame.

In the motorcycle, auxiliary devices are disposed closely with one another within the body frame portion, and additional installation of the canister into body frame portion will increase the entire volume of the body frame portion, which will necessarily increase the overall size of the body frame. The thus enlarged body frame hinders downsizing of the vehicle body.

There is a keen demand for a motorcycle provided with a canister and capable of downsizing a body frame.

PRIOR ART LITERATURE

Patent Document

Patent Document 1: Japanese Utility Model Application Laid-open Publication (JP-U-A1) No. 3-25851.

SUMMARY OF THE INVENTION

Object Sought to be Solved by Invention

It is an object of the present invention to provide a motorcycle equipped with a canister and capable of downsizing a body frame.

Means to Solve the Object

According to the present invention, there is provided a motorcycle comprising: a body frame provided with a front wheel and a rear wheel; a fuel tank mounted on the body frame for holding a fuel; a canister for adsorbing fuel vapor generated in the fuel tank; and a pair of left and right tandem steps provided on the body frame for supporting a foot of a pillion passenger, wherein the canister is disposed along the body frame at a position outside the body frame in a width direction of the motorcycle and closer to the body frame than a tip end of one of the left and right tandem steps.

Preferably, the body frame includes retainer brackets for retaining respective ones of the tandem steps, and the canister is arranged to overlap the retainer brackets in the width direction of the motorcycle.

It is preferable that the retainer brackets have a V-shaped configuration extending downwards from the body frame, the tandem steps are mounted to lower ends of the V-shaped retainer brackets, a bridge member is mounted to extend transversely across a vertically intermediate portion of one of the V-shaped retainer brackets which is associated with the one tandem step, and the canister is removably mounted to the bridge member.

Preferably, the body frame is comprised of a main frame having at a front part thereof a head pipe steerably supporting a front fork and, at a rear part thereof, a pivot plate pivotally supporting a swing arm for allowing vertical swinging movement of the swing arm, a seat rail extending rearwards from the main frame and supporting a seat, and a sub-frame extending obliquely downward in a forward direction from a longitudinally intermediate portion of the seat rail to the pivot plate for supporting the seat rail, wherein the sub-frame is provided with each of the tandem steps, and the canister is mounted to the body frame such that a central axis of the canister is disposed below a central axis of the sub-frame.

It is preferable that the canister has a cylindrical shape, and the cylindrical canister has an outer peripheral surface portion located remote from the body frame and covered with a semi-cylindrical cover.

Advantageous Effects of the Invention

According to the present invention, the canister is disposed outside the body frame in the width direction of the motorcycle. This arrangement makes it possible to avoid undue increase in size of the body frame and can easily achieve downsizing of the body frame.

Furthermore, the canister is disposed along the body frame at a position closer to the body frame than the tip end of one tandem step. The tandem step doubles in function as a step for supporting a foot of a pillion passenger and also as a protective member for the canister. With this arrangement, the number of necessary components can be reduced as compared to an arrangement in which a separate canister protection member is provided.

According to the invention, the body frame includes the retainer brackets for retaining the tandem steps, and the canister is disposed in a position overlapped with the retainer brackets. The canister is protected by an adjacent one of the retainer brackets. Furthermore, the retainer bracket has both a function to retain the associated tandem step and a function to retain the canister. This arrangement achieves a substantial reduction in the number of components as compared to another arrangement including a separate bracket provided exclusively for protecting the canister.

According to the invention, the V-shaped retainer brackets extend downwards from the body frame, the tandem steps are mounted to lower ends of the V-shaped retainer brackets, a bridge member is mounted to extend transversely across a vertically intermediate portion of one of the V-shaped retainer brackets, and the canister is removably mounted to the bridge member. The bridge member mounted to extend transversely across the vertically intermediate portion of the V-shaped retainer bracket functions to increase the rigidity of the V-shaped retainer bracket.

Furthermore, by virtue of a bracket including the bridge member and mounted to bridge across a V-shaped space of the V-shaped retainer bracket, the canister can be arranged to come close to the body frame. As a result, the tandem step can be also arranged to come close to the body frame and this arrangement contributes to downsizing of the motorcycle.

According to the invention, each of the tandem steps is provided on a sub-frame which supports a seat rail. The canister has a central axis disposed below a central axis of the sub-frame when viewed in a side view. The canister can thus be disposed below the sub-frame, and this arrangement lowers the center of gravity of the motorcycle. Additionally, because of the canister arranged to come close to a longitudinal centerline of the motorcycle body, it is possible to improve motion performance of the motorcycle.

According to the present invention, the canister has a cylindrical shape, and the cylindrical canister has an outer peripheral surface portion located remote from the body frame and covered with a semi-cylindrical cover. An outer peripheral surface portion of the canister which faces the body frame is not covered at all and hence can be cooled by a travel wind. Furthermore, by virtue of the semi-cylindrical cover provided to cover the first-mentioned outer peripheral surface portion facing away from the body frame, a desired level of external appearance can be retained.

MODE FOR CARRYING OUT THE INVENTION

A certain preferred embodiment of the present invention will be discussed below with reference to the accompanying drawings.

Figure 1:
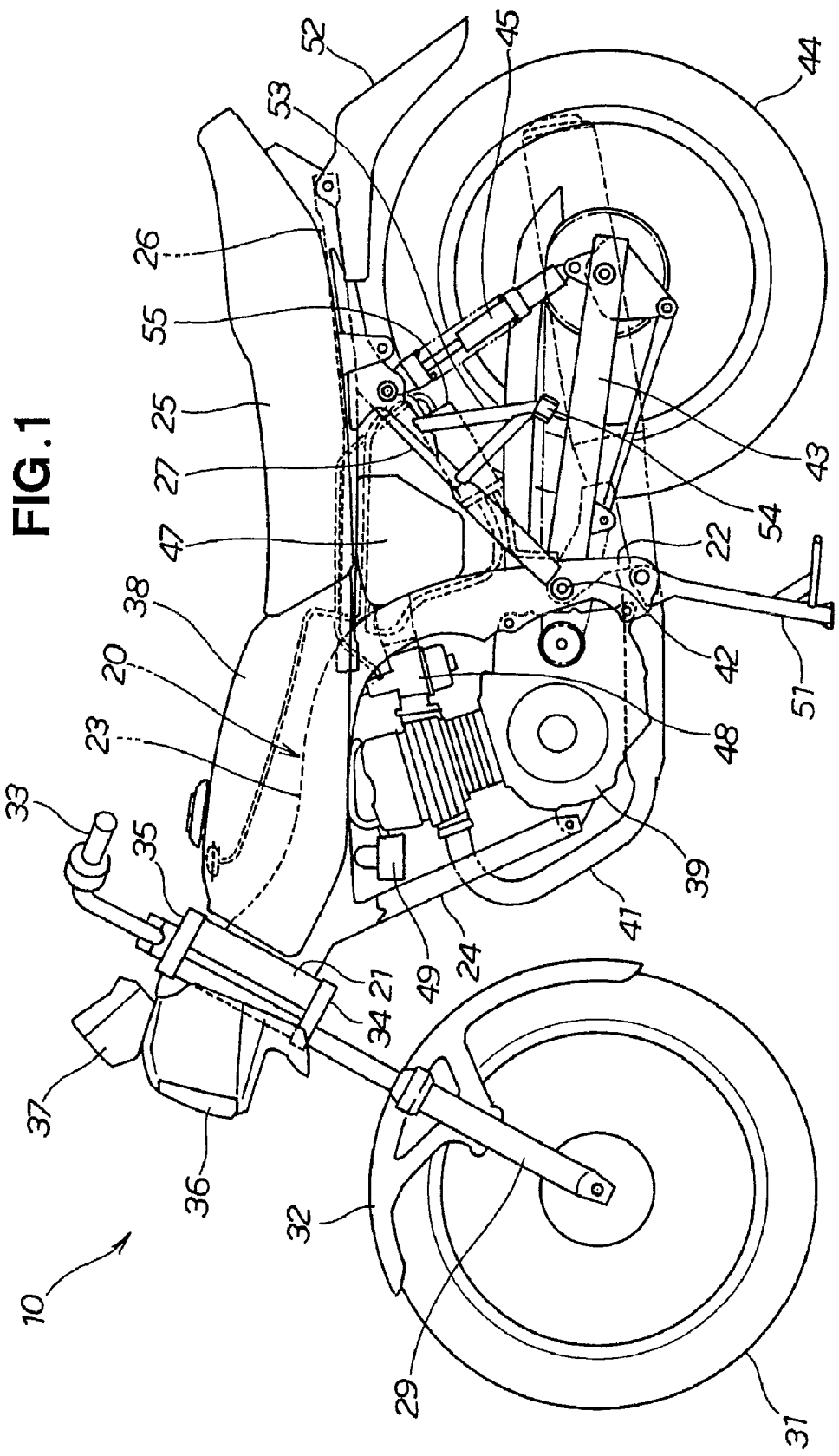
FIG. 1 is a left side view of a motorcycle according to the present invention.

As shown in FIG. 1, a motorcycle 10 has a body frame 20 formed jointly by a main frame 23, a down tube 24, a seat rail 26, and a sub-frame 27. The main frame 23 has a head pipe 21 at a front part thereof and a pivot plate 22 at a rear part thereof. The down tube 24 extends downwards from the front part of the main frame 23. The seat rail 26 extends rearwards from the rear part of the main frame 23 for supporting a tandem seat 25. The sub-frame 27 extends obliquely downward in a forward direction from a longitudinally intermediate portion of the seat rail 26 to the pivot plate 22 in order to prevent bending or deformation of the seat rail 26.

A telescopic front fork 29 is steerably mounted to the head pipe 21. A front wheel 31 is rotatably provided at a lower end of the front fork 29. The front fork 29 is provided with a front fender 32, which covers an upper part of the front wheel 31. A handlebar 33 is provided at an upper end of the front fork 29.

A headlight 36 is provided between front parts of a bottom bridge 34 and a top bridge 35 that are provided to grip the head pipe 21. A meter case 37 is disposed on the headlight 36. A fuel tank 38 is mounted on the main frame 23. An engine 39 is disposed below the fuel tank 38, and an exhaust pipe 41 extends from the engine 39. The tandem seat 25 is disposed on the seat rail 26. A swing arm 43 extends from the pivot plate 22 via a pivot shaft 42, and a rear wheel 44 is rotatably provided at a rear end of the swing arm 43. A rear cushion 45 extends obliquely between the swing arm 43 and the sub-frame 27.

An air-cleaner 47 is disposed in a triangular space defined jointly by the seat rail 26, the pivot plate 22 and the sub-frame 27. A carburetor 48 is disposed in an intake system extending from the air-cleaner 47 to the engine 39. The main frame 23, the down tube 24 and the engine 38 together form a space in which a secondary air control valve 49 is disposed. The secondary air control valve 49 functions to supply air (secondary air) to an exhaust port of the engine 39 under certain conditions, thereby burning unburned combustible components contained in exhaust gases.

A stand 51 is pivotally mounted to a lower part of the pivot plate 22, and a rear fender 52 is mounted to a rear end of the seat rail 26 so as to cover an upper part of the rear wheel 44.

A V-shaped bracket 53 extends downwards from the sub-frame 27, and a tandem step 54 is provided at a lower end of the V-shaped bracket 53. The tandem step 54 is a step for supporting a foot of a pillion passenger seated on a rear part of the tandem seat 25. The tandem step 54 is provided in a left-and-right pair, and a canister 55 is disposed above a right tandem step (located on the back side of the drawing sheet) and along the sub-frame 27. Operation of the canister 55 will be described with reference to the drawing figures specified below.

Figure 2:
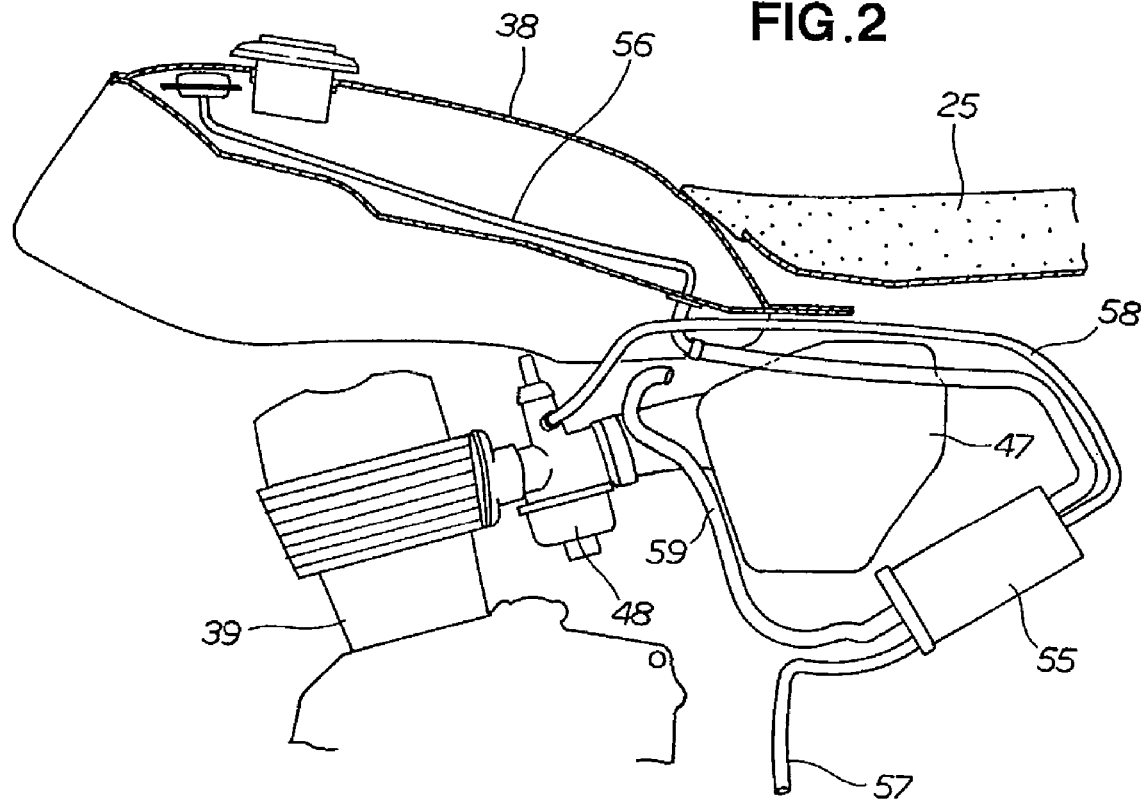
FIG. 2 is a diagrammatical view showing a piping arrangement of a canister shown in FIG. 1.

The canister 55 includes a cylindrical case filled with an adsorbing agent such as activated carbon. As shown in FIG. 2, the canister 55 adsorbs and stores fuel vapor via an exhaust pipe 55 extending from an interior upper part of the fuel tank 38.

While the engine is stopped at parking, for example, air from which fuel vapor has been removed is discharged from a drainage pipe 57.

Alternatively, while the engine 39 is running, the fuel vapor is fed from the canister 55 via a purge pipe 58 to the carburetor 48 for subsequent combustion in the engine 39 and, at the same time, a fresh air is introduced via a fresh-air intake pipe 59 into the canister 55. The fresh-air intake pipe 59 has a front end disposed to open in the proximity of the air-cleaner 47. Because an area in the proximity of the air-cleaner 47 is far away from the road surface and covered at its upper portion by the tandem seat 25 and the fuel tank 38, as also shown in FIG. 1, clean air can be obtained through the fresh-air intake pipe 59.

Figure 3:
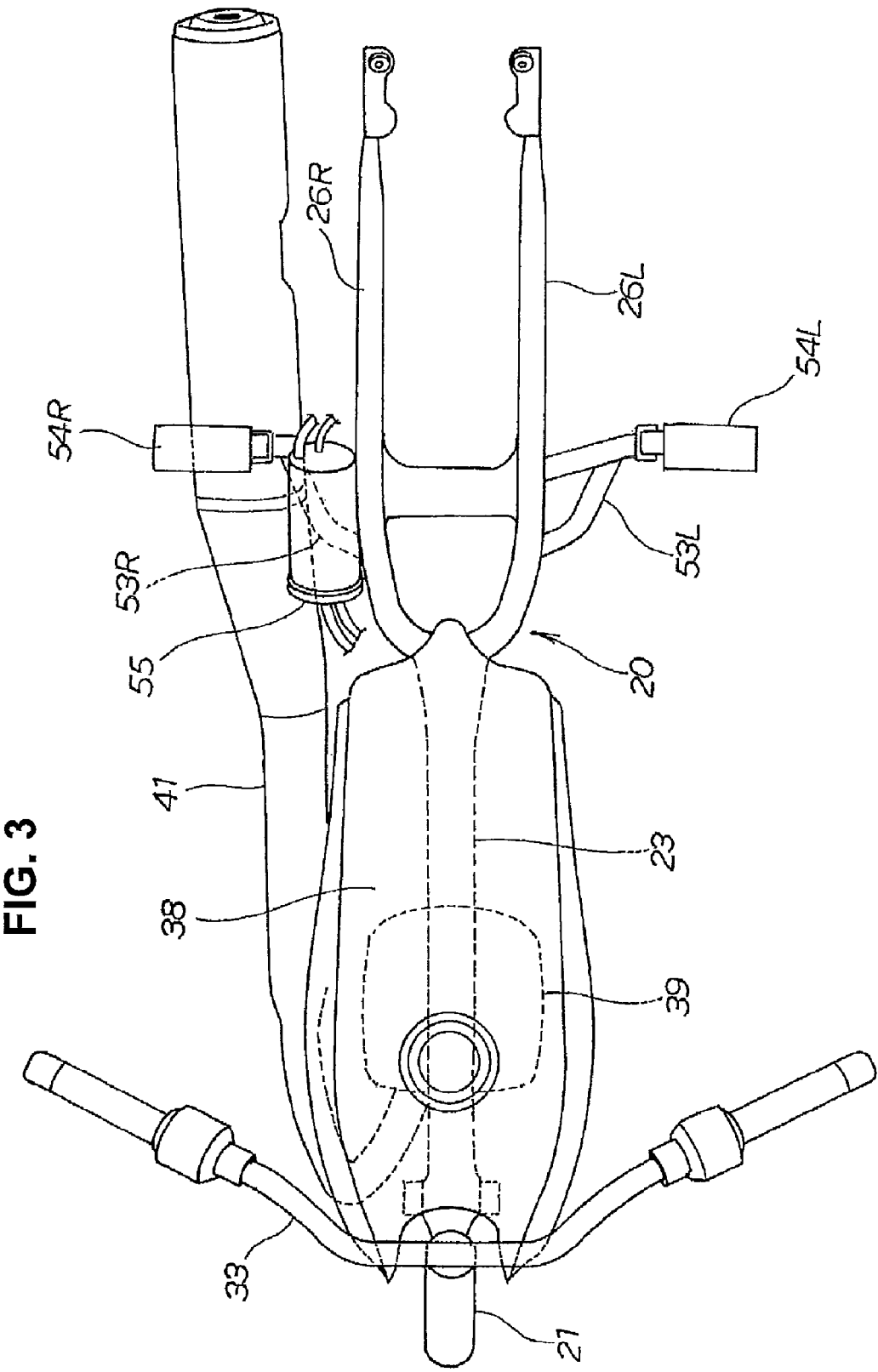
FIG. 3 is a top plan view of the motorcycle showing the positional relationship between the canister and other components.

As shown in FIG. 3, the main frame 23 extends along a longitudinal centerline of a body of the motorcycle, and the fuel tank 38 is disposed astride the main frame 23. The engine 39 is disposed below the fuel tank 38, and the exhaust pipe 41 extends from the engine 39 along a right side of the main frame 23. Two seat rails 26L, 26R (here, the letters "L" and "R" are suffixes indicative of the left and the right, respectively, which will be added as needed) extend in a bifurcated manner from a rear end of the main frame 23. In a plan view, a left V-shaped bracket 53L is seen as being disposed on a left outer side of the left seat rail 26L with a left tandem step 54L provided on the left V-shaped bracket 53L, and a right V-shaped bracket 53R is seen as being disposed on a right outer side of the right seat rail 26R with a right tandem step 54R provided on the right V-shaped bracket 53R.

More specifically, when viewed in a side view of the motorcycle 10, the right V-shaped bracket 53R constitutes a retainer bracket, which retains the tandem step 54 on the body frame 20. The canister 55 is disposed in the proximity of the right V-shaped bracket 53R. More particularly, the canister 55 is disposed along the body frame 20 at a position outside the body frame 20 in a width direction of the motorcycle 10.

Figure 4:
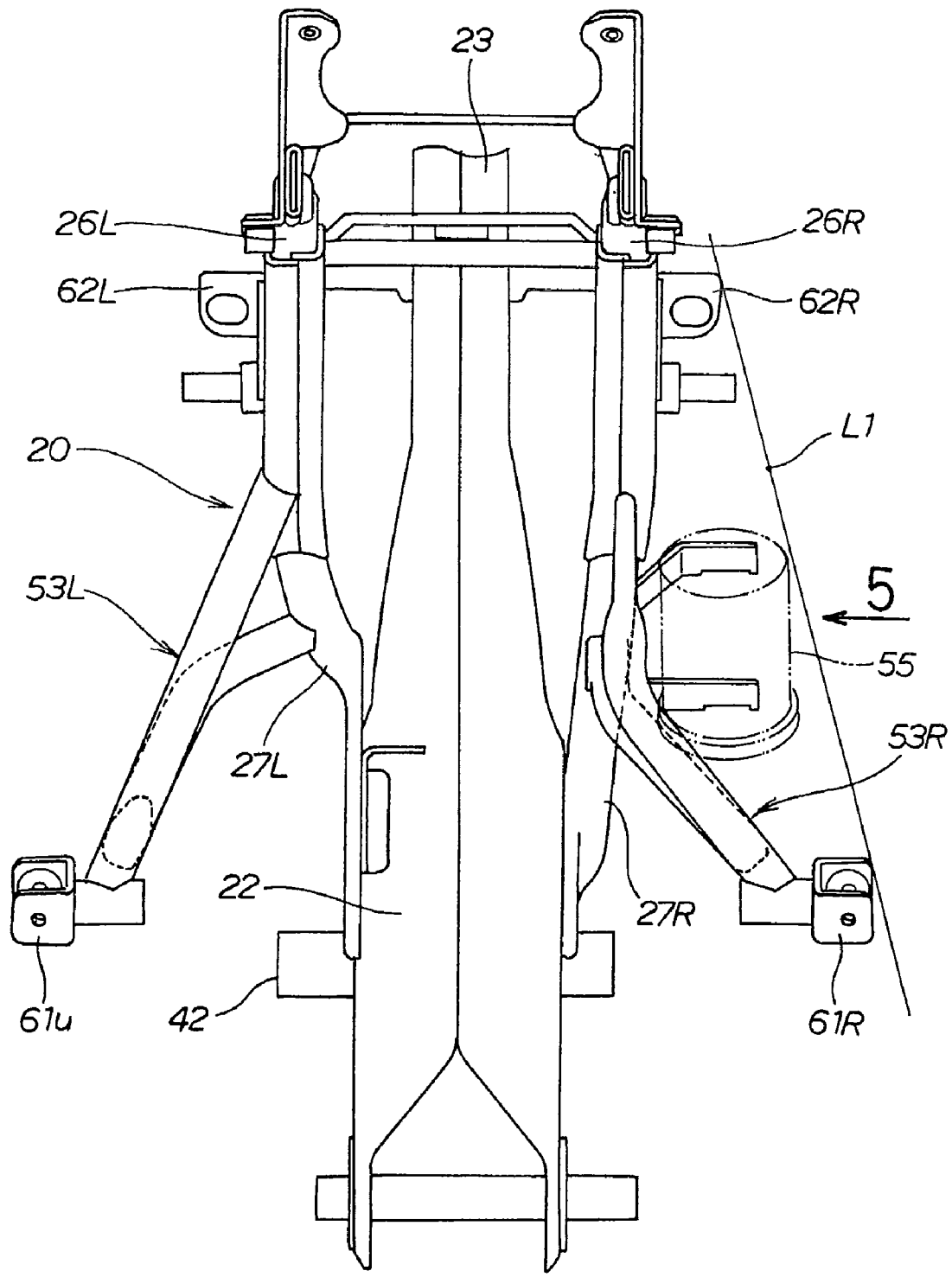
FIG. 4 is a bottom view showing the positional relationship between the canister and a body frame.

As shown in FIG. 4, the pivot plate 22 is broad or enlarged in width and extends downwards from the main frame 23. The pivot shaft 42 is provided on the pivot plate 22. Left and right sub-frames 27L and 27R extend upwardly from the pivot plate 22 to the left and right seat rails 26L, 26R, respectively.

The left V-shaped bracket 53L extends from the left sub-frame 27L, and the right V-shaped bracket 53R extends from the right sub-frame 27R. The right V-shaped bracket 53R is bent into a dogleg shape projecting convexly toward the longitudinal centerline of the motorcycle body in view of the installation of the canister 55 indicated by phantom lines.

A straight line L1 is a line, which connects a front end (namely, a step hinge portion 61R) of the right V-shaped bracket 53R and a plate 62R provided on the sub-frame 27. The canister 55 is disposed on an inner side of the straight line L1 as viewed in the width direction of the motorcycle, so that even when the motorcycle rolls to the right side, the canister 55 is kept out of contact with the road surface.

The tandem step 54R (FIG. 3) is foldably mounted to the step hinge portion 61R. The tandem step 54R serves as a step for supporting a foot of a pillion passenger and also as a protective member for the canister 55. By thus arranging the tandem step 54R, it is possible to reduce the number of components as compared to an arrangement in which a separate canister protection member is provided.

Figure 5:
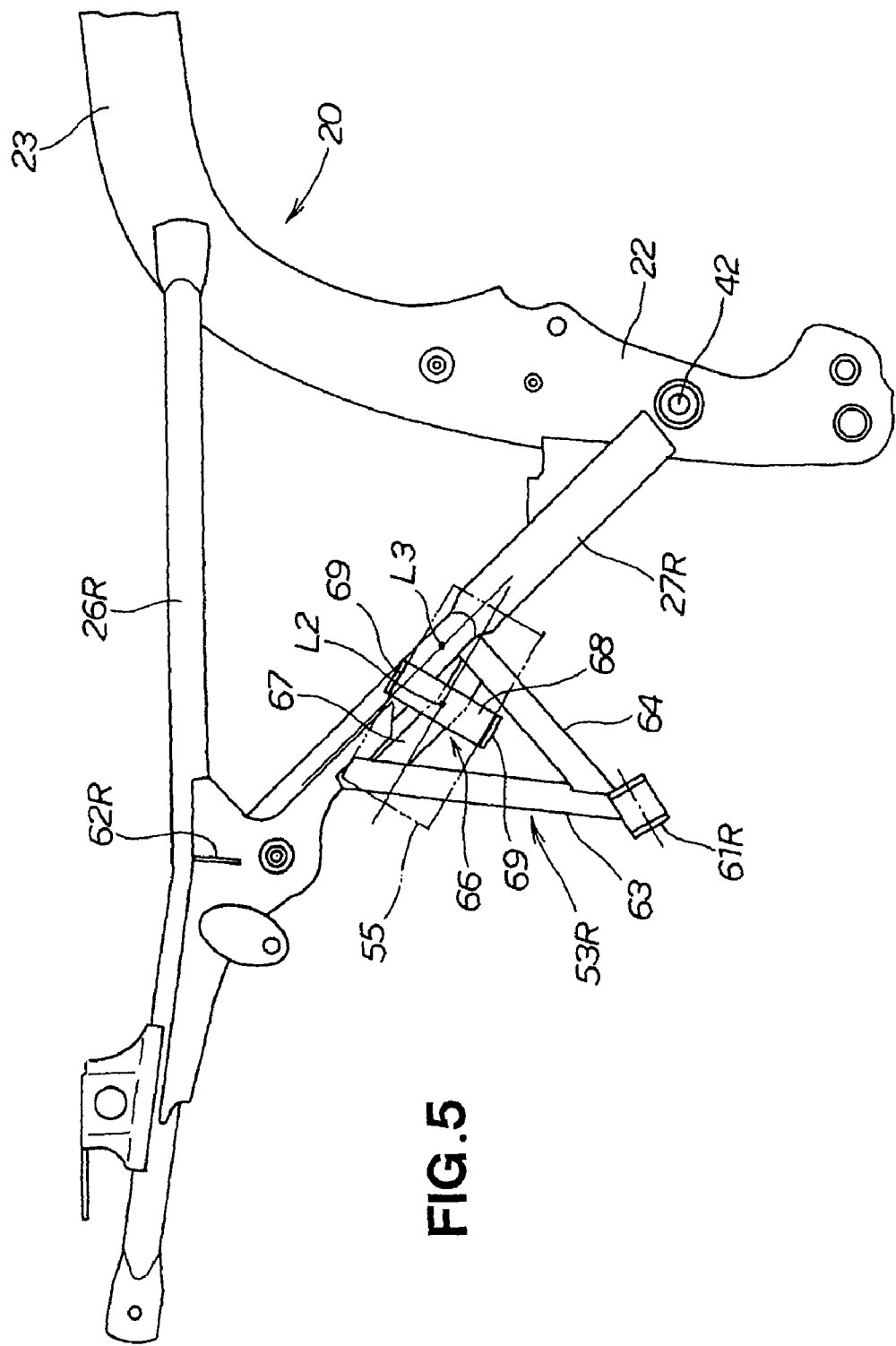
FIG. 5 is a view in the direction of arrow 5 shown in FIG. 4.

As shown in FIG. 5, the seat rail 26R extends from the main frame 23, and the sub-frame 27R extends obliquely downward in a forward direction from a longitudinally intermediate portion of the seat rail 26R to the pivot plate 22. The V-shaped bracket 53R extends downwards from the sub-frame 27R.

The V-shaped bracket 53R is formed jointly by a rear pipe 63 extending from the sub-frame 27R, and a front pipe 64 extending from the sub-frame 27R and joined to a lower portion of the rear pipe 63. The step hinge portion 61R is provided on a lower end of the rear pipe 63.

A cross-shaped bracket 66 is mounted to bridge across a vertically intermediate portion of the V-shaped bracket 53. The cross-shaped bracket 66 is composed of a bridge member 67 mounted to extend transversely across the vertically intermediate portion of the V-shaped bracket 53, and a vertical portion or member 68 attached crosswise to the bridge member 67.

The canister 55 indicated by phantom lines has a central axis L2, which is disposed below a central axis L3 of the sub-frame 27R. As shown in FIG. 1, the central axis of the canister 55 is disposed below the central axis L3 of the sub-frame 27R. Since the canister 55 can thus be disposed below the sub-frame 27, it is possible to lower the center of gravity of the motorcycle.

As shown in FIG. 5, the central axis L2 of the canister 55 is inclined to the central axis L3 of the sub-frame 27R when viewed in a side view. In other words, the central axis L2 is not parallel to the central axis L3.

If the central axis L2 is parallel to the central axis L3, the entire canister 55 will need to separate from the sub-frame, which will result in an enlargement in size of the V-shaped bracket R.

However, according to the illustrated embodiment, the central axis L2 is inclined to the central axis L3 when viewed in a side view, so that the canister 55 can be disposed closely to the sub-frame 27R while keeping an appropriate clearance between the canister 55 and sub-frame 27R. Thus, a substantial weight reduction can be achieved without increasing the size of the V-shaped bracket 53R.

Furthermore, as viewed in a side view of the motorcycle, the phantom-lined canister 55 is disposed in a position, which overlaps the V-shaped bracket 53R as a retainer bracket for retaining the tandem step. With this overlapped arrangement, the V-shaped bracket 53R is able to offer a protective action to the canister 55. Additionally, because the retainer bracket that is provided to retain the tandem step is also provided with a canister supporting function, it is possible to reduce the number of components as compared to an arrangement in which a separate canister retainer bracket is provided.

The vertical bracket member 68 has insertion lugs 69 bent in a front side of the drawing sheet. The shape and configuration of the insertion lugs 69 will be described in details with reference to FIG. 6.

Figure 6:
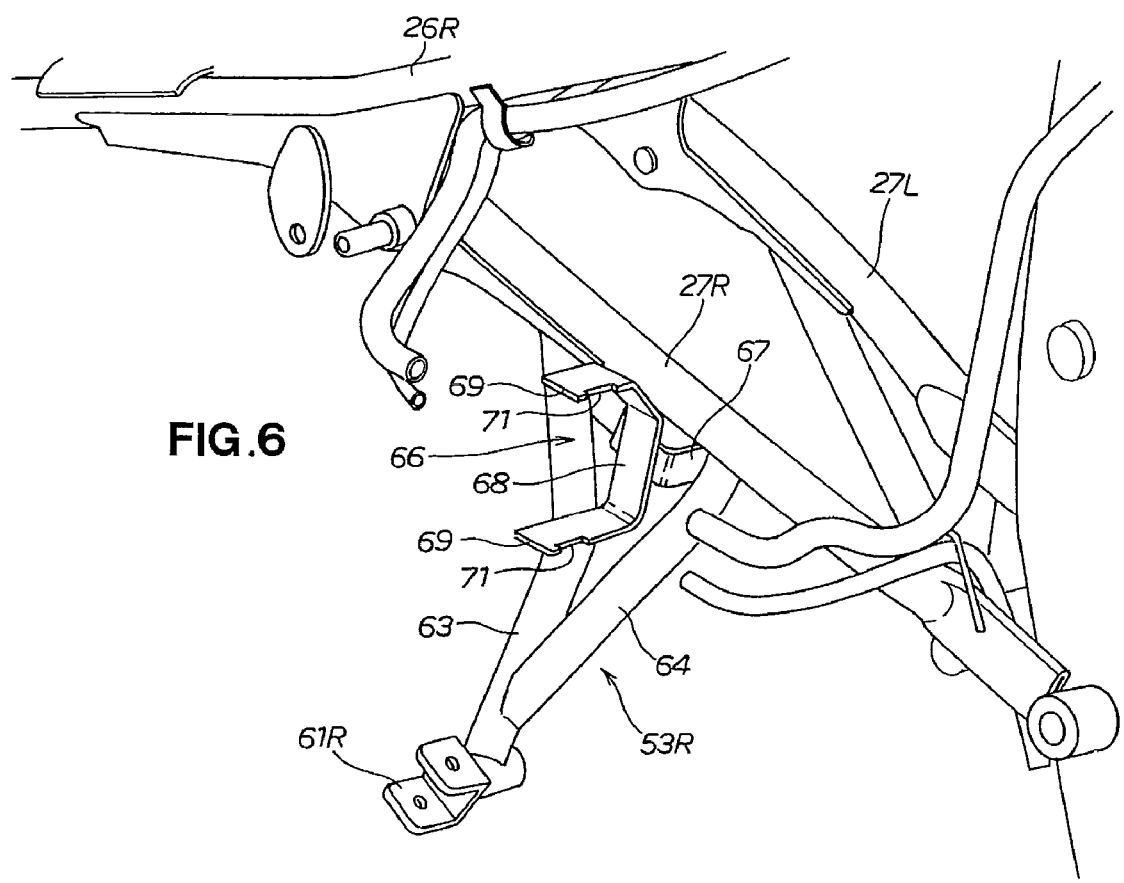
FIG. 6 is a perspective view showing the relationship between a V-shaped bracket and a cruciform bracket.

As shown in FIG. 6, the insertion lugs 69 have cutout or recessed portion formed respectively therein. The recessed portions 69 have a function to improve the joint performance with respect to socket members (rectangular gate protrusions 75 shown in FIG. 7).

A sequence of operations to be achieved to mount the canister 55 to the V-shaped bracket 53 will be described below.

Figure 7:
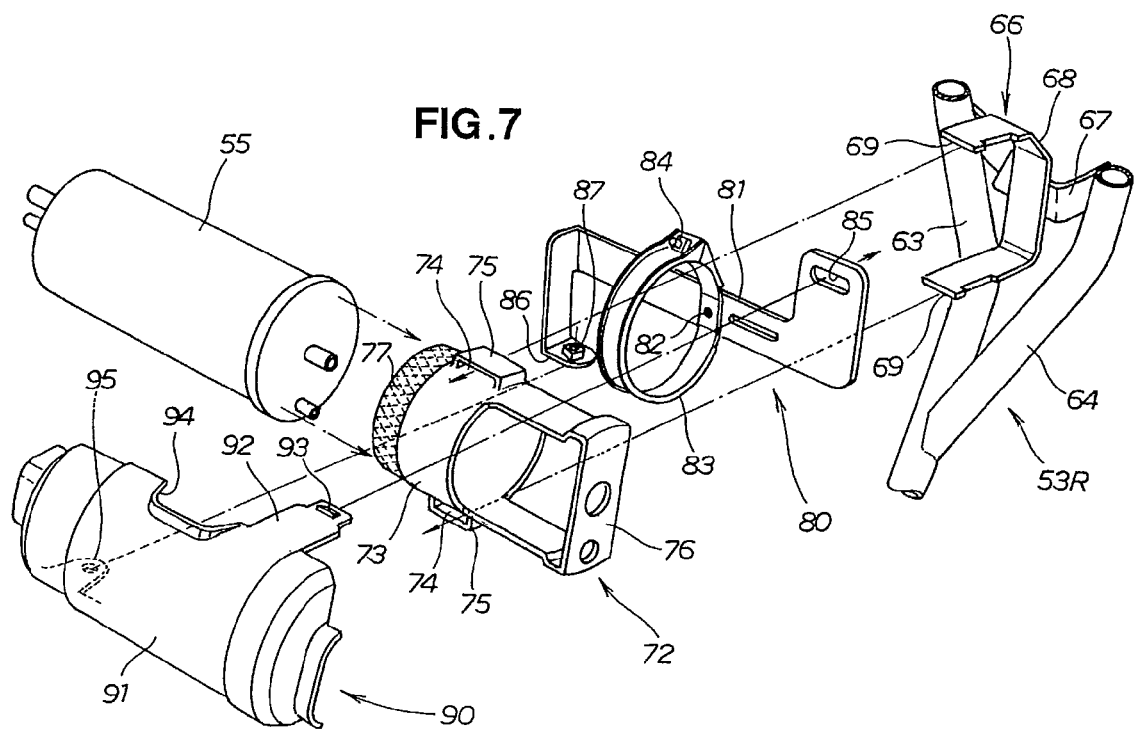
FIG. 7 is an exploded perspective view of attachment members used for attaching the canister to the V-shaped bracket.

As shown in FIG. 7, with the bridge member 67 attached to extend transversely across a vertically intermediate portion of the V-shaped bracket 53R, the canister 55 is removably mounted to the bridge member 67 in a manner as described below. The bridge member 67 thus provided to extend transversely across the vertically intermediate portion of the V-shaped bracket 53R functions to increase the rigidity of the V-shaped bracket 53R.

In order to mount the canister 55 on the motorcycle body, a soft case 72, a stay 80 with a band, and a semi-cylindrical cover 90 are provided. The soft case 72 is made of rubber or soft synthetic resin and includes a cylindrical portion 73 having a size or diameter receptive of the canister 55, a pair of upper and lower rectangular gate protrusions 75, 75 formed to project from an outer circumferential surface of the cylindrical portion 73 and having a pair of slits 74, 74, respectively, and a U-shaped portion 76 extending from one end of the cylindrical portion 73. An opposite end of the cylindrical portion 73 forms a bound part 77, which is indicated by cross-hatching for easy reference.

The stay 80 with a band is comprised of a crank-shaped plate 81 press-formed from a metal sheet into a crank shape, a band 83 attached by a screw 82 to a central portion of the crank-shaped plate 81, a clamp screw 84 for fastening the band 83, a slot 85 formed in one end of the crank-shaped plate 81, an arm portion 86 formed by bending at an opposite end of the crank-shaped plate 81, and a nut 87 welded to a front end of the arm portion 86.

The semi-cylindrical cover 90 includes a semi-cylindrical body portion 91, a tongue 92 extending from an upper front part of the semi-cylindrical body portion 91, a locking prong 93 formed on a front end of the tongue 92, a receiving recess 94 formed diametrically across a longitudinally central part of the semi-cylindrical body portion 91 for receiving therein the rectangular gate protrusions 75, and a projecting lug 95 extending from a lower rear part of the semi-cylindrical body portion 91.

At first, the canister 55 having a cylindrical shape is fully inserted in the soft case 72 until a front wall of the canister 55 is in abutment with the U-shaped portion 76. In this instance, the bound portion 77 of the soft case 72 is located around a substantially central portion of the canister 55. Then, the band 83 is fitted around the bound portion 77, and the clamp screw 84 is tightened.

Now, the soft case 72 has the canister 55 inserted therein and is attached to the stay 80 via the band 83. The soft case 72 is then brought toward the V-shaped bracket 53R in such a manner that the insertion lugs 69 of the cross-shaped bracket 66 are inserted through the slits 74 of the soft case 72 to thereby attach the soft case 72 to the cross-shaped bracket 66.

Figure 8:
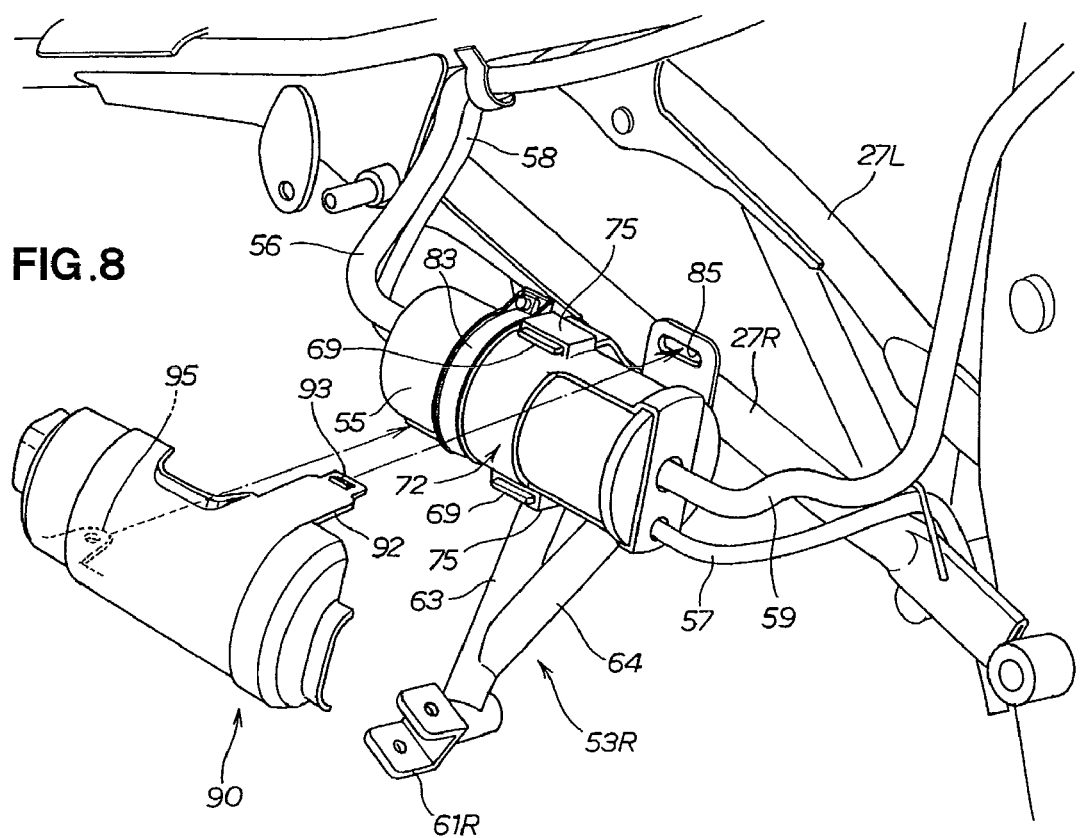
FIG. 8 is a perspective view illustrative of a manner in which a semi-cylindrical cover is attached to the canister.

As shown in FIG. 8, by virtue of the upper and lower insertion lugs 69, the soft case 72 fixed in position and, as a result, the canister 55 is disposed along the sub-frame 27R. Subsequently, the tongue 92 projecting from the semi-cylindrical cover 90 is inserted through the slot 85 in the stay 80. After this insertion, a joint between the tongue 92 and the stay 80 is maintained by the action of the locking prong 93. When the semi-cylindrical cover 90 is pulled with a force greater than a predetermined value, the locking prong 93 undergoes elastic deformation, which will lower a joint strength between the tongue 92 and the stay 80 and eventually allow the tongue to be pulled out from the slot 92 of the stay 80. The projecting lug 95 extending from the lower rear part of the semi-cylindrical cover 90 is placed below a rear part of the canister 55.

Figure 9:
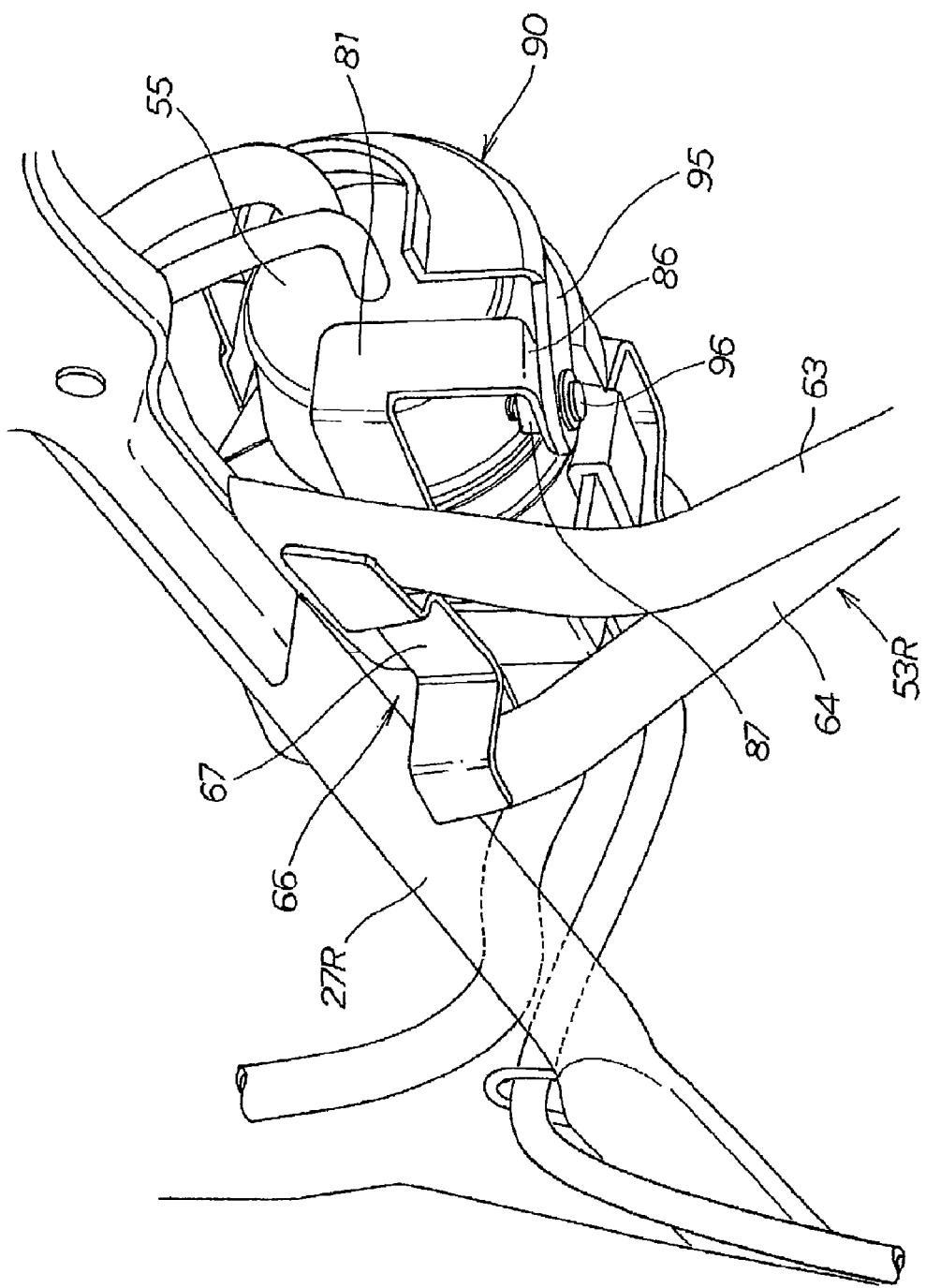
FIG. 9 is a perspective view showing the semi-cylindrical cover as attached to the canister.

As shown in FIG. 9, the projecting lug 95 extending from the semi-cylindrical cover 90 overlaps with the arm portion 86 of the crank-shaped plate 81. A bolt 96 is inserted from below into the arm portion 86 and then threaded into the nut 87. A rear part of the rear part of the semi-cylindrical cover 90 is thus fixed in position.

It appears clear from FIG. 9 that the bridge member 67 of the cross-shaped bracket 66 is disposed behind the V-shaped bracket 53R (in such a manner as to bridge a surface of the rear pipe 63 and a surface of the front pipe 64 both facing toward the longitudinal centerline of the motorcycle body). With this arrangement, the entire cross-shaped bracket 66 comes close to the longitudinal centerline of the motorcycle body (to the left in FIG. 9). It is therefore possible to arrange the canister 55 to come close to the longitudinal centerline of the motorcycle body.

Figure 10:
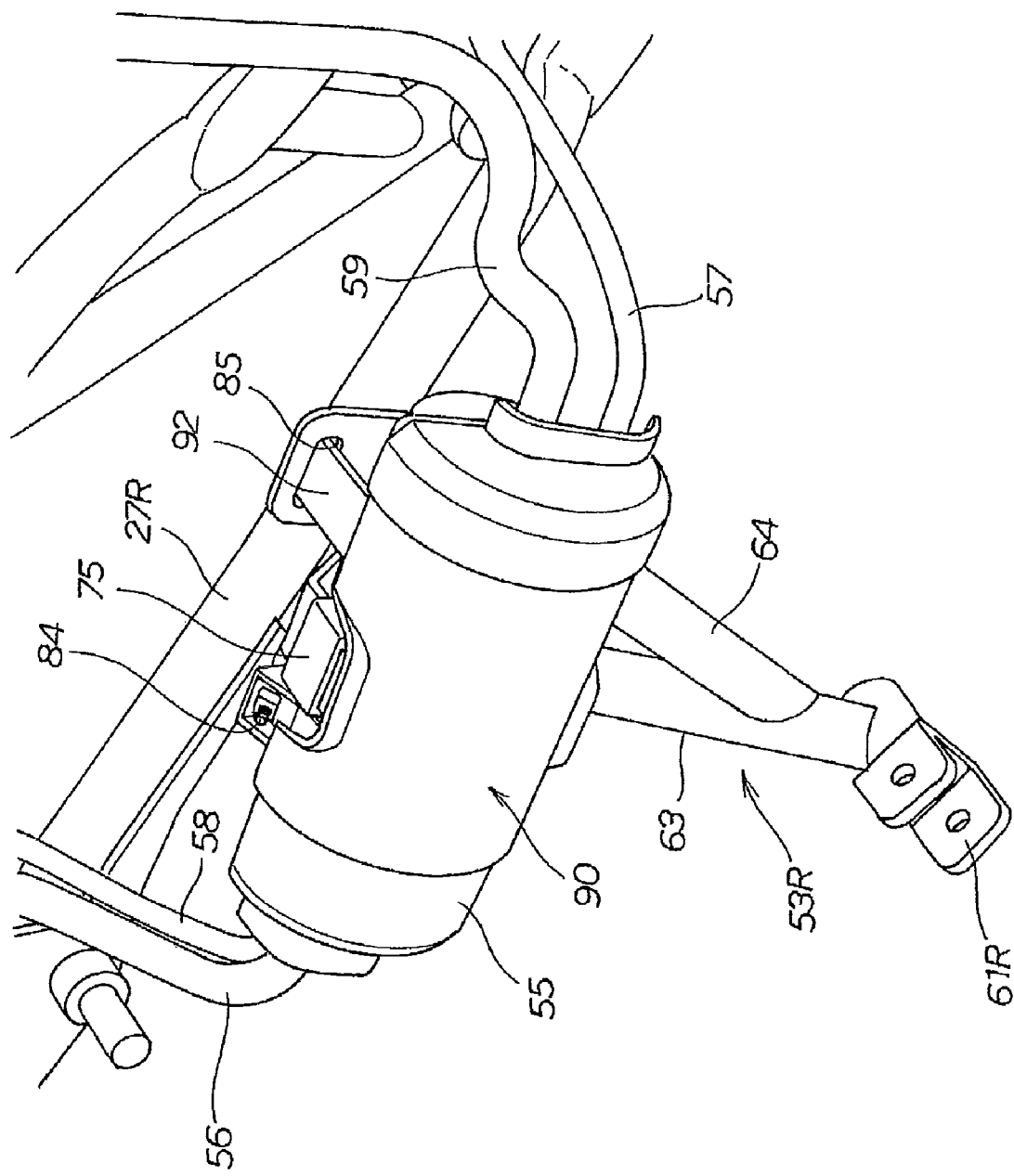
FIG. 10 is a perspective view of the canister shown with the semi-cylindrical cover attached thereto.

As shown in FIG. 10, an outer peripheral surface portion of the canister 55, which faces away from the longitudinal centerline of the motorcycle body, is covered with the semi-cylindrical cover 90 and, hence, the canister 55 is sightly in appearance. On the other hand, an outer peripheral surface portion of the canister 55, which faces toward the longitudinal centerline of the motorcycle body, is not covered by the semi-cylindrical cover 90 but exposed to air. Accordingly, the last-mentioned outer peripheral surface portion of the canister 55, which faces toward the longitudinal centerline of the motorcycle body, is sufficiently cooled by a travel wind.

Although in the illustrated embodiment, the semi-cylindrical cover is fitted over the canister, and the central axis of the canister is disposed below the central axis of the sub-frame, these features should be construed as being optional and not indispensable to the invention. The retainer bracket for retaining the tandem step may be a triangular plate or a U-shaped pipe in addition to the V-shaped bracket, and the shape and configuration of the retainer bracket can be arbitrarily determined.

Furthermore, according to the invention, the canister needs to be disposed outside the body frame in a width direction of the motorcycle body. It is an arbitrary matter of choice that the canister is mounted to the retainer bracket which is provided for supporting the tandem step.

The term "tip end of the tandem step" used herein in conjunction with the illustrated embodiment should be literally interpreted as long as the tandem step is fixedly mounted to the body frame. However, for a folding tandem step pivotally mounted to a step hinge portion as in the illustrated embodiment, this term can be interpreted as meaning a front end of the step hinge portion.

Furthermore, while in the illustrated embodiment, the canister is disposed outside the body frame on the right side of the body frame, the canister can alternatively be disposed outside the body frame on the left side of the body frame.

INDUSTRIAL APPLICABILITY

The present invention is particularly suitable for use in a motorcycle provided with a canister.

LEGEND

10: motorcycle, 20: body frame, 21: head pipe, 22: pivot plate, 23: main frame, 26, 26R: seat rail, 27, 27R: sub-frame, 31: front wheel, 38: fuel tank, 43: swing arm, 44: rear wheel, 53, 53R: retainer bracket (V-shaped bracket), 54, 54R: tandem step, 55: canister, 61: step hinge portion, 67: bridge member, 90: semi-cylindrical cover, L2: central axis of canister, L3: central axis of sub-frame

The invention claimed is:

1. A motorcycle comprising:
a body frame provided with a front wheel and a rear wheel;
a fuel tank mounted on the body frame for holding a fuel;
a canister for absorbing fuel vapor generated in the fuel tank; and
a pair of left and right tandem steps provided on the body frame for supporting a foot of a pillion passenger,
wherein the canister is disposed along the body frame at a position outside the body frame in a width direction of the motorcycle and closer to the body frame than a tip end of one of the left and right tandem steps,
wherein the body frame includes retainer brackets for retaining respective ones of the tandem steps, and the canister is arranged to overlap the retainer brackets in the width direction of the motorcycle,
wherein the retainer brackets have a V-shaped configuration extending downwards from the body frame, the tandem steps are mounted to lower ends of the V-shaped retainer brackets, a bridge member is mounted to extend transversely across a vertically intermediate portion of one of the V-shaped retainer brackets which is associated with said one tandem step, and the canister is removably mounted to the bridge member, and
wherein the canister is disposed at a position outside the retainer brackets.

2. The motorcycle as claimed in claim 1, wherein the body frame is comprised of
a main frame having, at a front part thereof,
a head pipe steerably supporting a front fork and, at a rear part thereof,
a pivot plate pivotally supporting a swing arm for allowing vertical swinging movement of the swing arm,
a seat rail extending rearwards from the main frame and supporting a seat, and
a sub-frame for supporting the seat rail, the sub-frame extending obliquely downward in a forward direction from a longitudinally intermediate portion of the seat rail to the pivot plate,
wherein the sub-frame is provided with each of the tandem steps, and the canister is mounted to the body frame such that a central axis of the canister is disposed below a central axis of the sub-frame.

3. The motorcycle as claimed in claim 2, wherein the sub-frame extends obliquely downward from a position on the seat rail that is above and rearward with respect to the canister, to a position on the pivot plate that is below and forward with respect to the canister.

4. The motorcycle as claimed in claim 1, wherein the canister has a cylindrical shape, and the cylindrical canister has an outer peripheral surface portion located remote from the body frame and covered with a semi-cylindrical cover.

5. The motorcycle as claimed in claim 1, wherein the body frame includes a plate positioned above the canister and protruding laterally outwardly of the motorcycle, and the canister is disposed on an inner side of a straight line connecting a front end of the plate and a front end of the bracket.

6. The motorcycle as claimed in claim 1, wherein the body frame includes a plate positioned above the canister and protruding laterally outwardly of the motorcycle, and the canister is disposed on an inner side of a straight line connecting a front end of the plate and a front end of the bracket.

7. A motorcycle comprising:
a body frame provided with a front wheel and a rear wheel;
a fuel tank mounted on the body frame for holding a fuel;
a canister for absorbing fuel vapor generated in the fuel tank; and
a pair of left and right tandem steps provided on the body frame for supporting a foot of a pillion passenger,
wherein the canister is disposed along the body frame at a position outside the body frame in a width direction of the motorcycle and closer to the body frame than a tip end of one of the left and right tandem steps,
wherein the body frame includes retainer brackets for retaining respective ones of the tandem steps, and the canister is arranged to overlap the retainer brackets in the width direction of the motorcycle,
wherein the retainer brackets have a V-shaped configuration extending downwards from the body frame, the tandem steps are mounted to lower ends of the V-shaped retainer brackets in a position below the canister, a bridge member is mounted to extend transversely across a vertically intermediate portion of one of the V-shaped retainer brackets which is associated with said one tandem step, and the canister is removably mounted to the bridge member, and
wherein the canister is disposed at a position outside the retainer brackets and above a muffler which extends rearwardly along a right side of the motorcycle.

8. The motorcycle as claimed in claim 7, wherein the body frame is comprised of
a main frame having, at a front part thereof,
a head pipe steerably supporting a front fork and, at a rear part thereof,
a pivot plate pivotally supporting a swing arm for allowing vertical swinging movement of the swing arm,
a seat rail extending rearwards from the main frame and supporting a seat, and
a sub-frame for supporting the seat rail, the sub-frame extending obliquely downward in a forward direction from a longitudinally intermediate portion of the seat rail to the pivot plate for supporting the seat rail,
wherein the sub-frame is provided with each of the tandem steps, and the canister is mounted to the body frame such that a central axis of the canister is disposed below a central axis of the sub-frame.

9. The motorcycle as claimed in claim 8, wherein the sub-frame extends obliquely downward from a position on the seat rail that is above and rearward with respect to the canister, to a position on the pivot plate that is below and forward with respect to the canister.

10. The motorcycle as claimed in claim 7, wherein the canister has a cylindrical shape, and the cylindrical canister has an outer peripheral surface portion located remote from the body frame and covered with a semi-cylindrical cover.

11. The motorcycle as claimed in claim 7, wherein the body frame includes a plate positioned above the canister and protruding laterally outwardly of the motorcycle, and the canister is disposed on an inner side of a straight line connecting a front end of the plate and a front end of the bracket.

12. A motorcycle comprising:
a body frame provided with a front wheel and a rear wheel;
a fuel tank mounted on the body frame for holding a fuel;
a canister for absorbing fuel vapor generated in the fuel tank; and
a pair of left and right tandem steps provided on the body frame for supporting a foot of a pillion passenger,
wherein the canister is disposed along the body frame at a position outside the body frame in a width direction of the motorcycle and closer to the body frame than a tip end of one of the left and right tandem steps,
wherein the body frame includes retainer brackets for retaining respective ones of the tandem steps, and the canister is arranged to overlap the retainer brackets in the width direction of the motorcycle,
wherein the retainer brackets have a V-shaped configuration extending downwards from the body frame, the tandem steps are mounted to lower ends of the V-shaped retainer brackets, a bridge member is mounted to extend transversely across a vertically intermediate portion of one of the V-shaped retainer brackets which is associated with said one tandem step, and the canister is removably mounted to the bridge member,
wherein the canister is disposed at a position outside the retainer brackets, and
wherein the body frame is comprised of
a main frame having, at a front part thereof,
a head pipe steerably supporting a front fork and, at a rear part thereof,
a pivot plate pivotally supporting a swing arm for allowing vertical swinging movement of the swing arm,
a seat rail extending rearwards from the main frame and supporting a seat, and
a sub-frame for supporting the seat rail, the sub-frame extending obliquely downward in a forward direction from a longitudinally intermediate portion of the seat rail to the pivot plate,
wherein the sub-frame is provided with each of the tandem steps.

13. The motorcycle as claimed in claim 12, wherein the canister has a cylindrical shape, and the cylindrical canister has an outer peripheral surface portion located remote from the body frame and covered with a semi-cylindrical cover.

14. The motorcycle as claimed in claim 12, wherein the sub-frame extends obliquely downward from a position on the seat rail that is above and rearward with respect to the canister, to a position on the pivot plate that is below and forward with respect to the canister.

* * * * *